United States Patent [19]

Campbell et al.

[11] Patent Number: 4,775,591

[45] Date of Patent: Oct. 4, 1988

[54] IONOMER COMPOSITIONS AND METHOD FOR THEIR PREPARATION

[75] Inventors: John R. Campbell, Clifton Park, N.Y.; Philip C. Johnson, Windsor, Mass.

[73] Assignee: General Electric Company, Schenectady, N.Y.

[21] Appl. No.: 56,514

[22] Filed: Jun. 1, 1987

[51] Int. Cl.$^4$ .................... C08K 9/04; C08L 71/04
[52] U.S. Cl. .................... 428/403; 427/215; 427/216; 427/221; 427/222; 428/407; 524/577; 525/132; 528/488; 528/490; 528/492
[58] Field of Search ............... 427/215, 216, 221, 222; 428/403, 407; 528/488, 490, 492; 525/132; 524/577

[56] References Cited

U.S. PATENT DOCUMENTS

| | | | |
|---|---|---|---|
| 4,000,116 | 12/1976 | Renner | 524/733 |
| 4,143,185 | 3/1979 | Lundberg et al. | 524/505 |
| 4,169,186 | 9/1979 | Tazaki et al. | 428/403 |
| 4,187,358 | 2/1980 | Kyo et al. | 525/132 |
| 4,233,387 | 11/1980 | Mammino et al. | 428/403 |
| 4,508,761 | 4/1985 | Miyoshi et al. | 427/221 |
| 4,511,712 | 4/1985 | Florence | |
| 4,529,761 | 7/1985 | Lohmeijer | 525/132 |
| 4,529,778 | 7/1985 | Shannon | 525/132 |
| 4,537,925 | 8/1985 | Luxon | 524/159 |
| 4,579,905 | 4/1986 | Krabbenhoft | 525/132 |

FOREIGN PATENT DOCUMENTS 136221 4/1985 European Pat. Off. .
224020 6/1987 European Pat. Off. .

Primary Examiner—Herbert J. Lilling
Attorney, Agent, or Firm—William H. Pittman; James C. Davis, Jr.; James Magee, Jr.

[57] ABSTRACT

Ionomers in the salt form, such as the ammonium salts of sulfonated polystyrene, are precipitated from solution in a non-polar organic liquid by contact with a polar liquid in which the ionomer has only limited solubility (e.g., methanol) and a particulate solid such as a polyphenylene ether, followed by contact with a salt such as ammonium chloride, preferably in solution in the polar liquid. The resulting ionomer-coated polyphenylene ether particles are easily filtered and handled.

20 Claims, No Drawings

IONOMER COMPOSITIONS AND METHOD FOR THEIR PREPARATION

This invention relates to solid ionomer compositions and methods for their preparation. More particularly, it relates to the preparation of solid particulate ionomer compositions which are versatile and easily handled.

Ionomers, i.e., polymers with ionic substituents, are known in the art and are of increasing interest in various aspects of polymer technology. The ionic substituent groups thereon may be anionic such as sulfonate or carboxylate groups, or cationic such as alkylammonium or quaternary ammonium. They are useful in the free acid or base form and also in the salt form, typically obtained by neutralization of the free acid or base form.

For cationic ionomers, typical neutralizing reagents are acids, such as hydrochloric and sulfuric acids; for anionic ionomers, bases, such as metal oxides or hydroxides, ammonia and amines may be used. Neutralized anionic ionomers, including those in the ammonium and amine salt form, are disclosed in a number of patents and published patent applications. Reference is made, for example, to U.S. Pat. Nos. 3,642,728, 3,870,841 and 4,537,925, European application No. 136,221 and copending, commonly owned application Ser. No. 791,881, filed Oct. 28, 1985, now abandoned. The last three of these disclosures relate to the use of ionomeric polystyrenes as compatibilizers of blends of polyphenylene ethers with ionomeric elastomers and with antistatic agents.

It is frequently convenient to prepare ionomers in the salt form by combining the neutralizing reagent with a solution of the free acid or base form of the polymer in an organic solvent, and then to precipitate the salt by blending said solution with an organic liquid which is a non-solvent therefor. However, ionomer recovery in solid form may be difficult by reason of the tendency of the ionomers to become plasticized by the solvent. In order to overcome this plasticizing effect, special recovery techniques are usually required. These include non-solvent precipitation and stripping with the aid of steam or hot water. Such methods frequently require specialized equipment, such as high-shear mixing devices which are not conveniently employable for polymer processing. Moreover, the solid ionomers thus obtained frequently have undesirably low bulk densities and inconveniently large particle sizes, and may be contaminated with reagents used in their preparation which must be removed prior to use.

A method for ionomer recovery in solid form, disclosed in U.S. Pat. No. 4,511,712, involves precipitation from a solvent such as methylene chloride by the addition of an organic salt solution such as a methanolic solution of ammonium chloride. While this method permits the recovery of the ionomer as a conveniently handled granular powder, vigorous mixing techniques (such as those requiring the aforementioned high-shear mixers) and very large quantities of alkanol or other non-solvent are required. Typical volume ratios of non-solvent to solvent are 2:1 and higher.

The present invention provides compositions comprising ionomers in convenient particulate form. It also provides a method for recovering such particulate compositions which is easily adaptable to produce a material having the desired particle size. Moreover, exotic mixing equipment and very high volumes of non-solvent materials are not required.

In one of its aspects, the invention is a method for precipitating an ionomer composition which comprises:

(I) effecting intimate contact between a solution of (A) at least one ionomer in the salt form in (B) a non-polar organic liquid; (C) a polar liquid which is soluble in component B and in which component A has only limited solubility; and (D) a particulate solid which is substantially insoluble in components B and C, the weight ratio of said particulate solid to component A being at least about 0.25:1;

(II) intimately contacting the resulting mixture with (E) at least one inorganic salt to cause precipitation of a particulate composition comprising a salt of said ionomer and component D; and (III) recovering said particulate composition.

The method of this invention is of general applicability to ionomers in the salt form and especially to anionic ionomers. Such ionomers, when in their free acid form, usually have $pK_a$ values up to about 5.0. Suitable ionomers generally comprise those containing carboxylate and sulfonate substituents. It is particularly effective with polymers having relatively low solubility in polar solvents such as water or methanol. Such polymers typically contain up to about 25% and preferably up to about 10% by weight of ionic substituents.

In terms of structure, a wide variety of ionomers are useful in the method of this invention. Most of them are derived from substantially aromatic base polymers; that is, base polymers in which a substantial proportion of the mers (i.e., repeating monomer-derived units) contain an aromatic moiety, such as a benzene or naphthalene group. In general, at least about 50% by number of the mers, preferably at least about 90% and frequently 100%, contain an aromatic moiety. They are usually addition polymers such as styrene homopolymers and copolymers, which are preferred, the homopolymers being particularly preferred. However, it is also within the scope of the invention to use aliphatic base polymers. The mers in such aliphatic polymers may be derived from one or more of monoolefinic compounds such as ethylene, propylene and isobutene; conjugated dienes such as butadiene, isoprene and chloroprene; and non-conjugated dienes such as 1,4-hexadiene, 1,4-cyclohexadiene and 5-methylene-2-norbornene. Particularly preferred aliphatic base polymers are the carbon atom backbone elastomers illustrated by natural rubber, synthetic diene rubbers, butyl rubbers, polyisobutene rubbers, ethylene-propylene rubbers, ethylene-propylene-diene rubbers wherein the diene is non-conjugated (EPDM rubbers) and chloroprene rubbers.

Ionomers in which the substituents are cationic are illustrated by addition copolymers of the above-listed monomers (e.g., styrene) and vinylpyridine. Among the preferred ionomers containing anionic substituents are those with carboxylate groups, illustrated by addition copolymers of acrylates and methacrylates with the above-listed monomers. Sulfonate groups are most preferred; polymers containing them are illustrated by the sulfonation products of the above-described polymers, as well as by addition copolymers of the above-listed monomers with sulfonate group-containing monomers such as 2-acrylamido-2-methylpropanesulfonates, sulfoethyl methacrylate salts and styrenesulfonates.

The number average molecular weight of the ionomer is most often at least about 10,000. There is no upper molecular weight limit; polymers with molecular weights in the millions may be used, but the value is usually not above 2,000,000. Most often, it is between about 40,000 and about 500,000.

While the invention is generally applicable to the previously described types of ionomers, it is particularly useful with those which contain anionic substituents and which are being isolated as their ammonium or amine salts. Such polymers are frequently identified hereinafter as being "in the ammonium or amine salt form". The term "amine salt" includes salts of aliphatic amines such as trimethylamine, triethylamine, 2-propylamine, 1-butylamine and di-1-butylamine; alicyclic amines such as cyclopentylamine and cyclohexylamine; aralkyl amines such as benzylamine; and heterocyclic amines such as pyrrole, piperidine, morpholine and pyridine.

The details of preparation of the salt form of the ionomer are not critical. Most often, the polymer in the acid form is dissolved in an organic solvent, which is then contacted with ammonia or the amine either undiluted or as a solution in water or in another suitable liquid. The essential feature, from the standpoint of this invention, is that the polymer is present in solution, hereinafter sometimes referred to as the "polymer solution", in a non-polar organic liquid (component B). The identity of the liquid and the concentration of the polymer solution therein are also not critical. Suitable liquids include aromatic hydrocarbons such as benzene, toluene and xylene; chlorinated aromatic hydrocarbons such as chlorobenzene and o-dichlorobenzene; chlorinated aliphatic hydrocarbons such as methylene chloride, chloroform and ethylene chloride; and other substituted aromatic hydrocarbons such as nitrobenzene. Particularly preferred are the chlorinated aliphatic hydrocarbons, especially methylene chloride. Most often, the concentration of the polymer solution is about 10–40% by weight.

Component C is a polar liquid. It may also be widely varied, provided that it is soluble in component B and dissolves only a limited amount of component A. Illustrative liquids are lower alkanols (preferably containing 1–4 carbon atoms) such as methanol, ethanol and 2-propanol and aprotic polar solvents such as dimethyl sulfoxide. The alkanols, especially methanol, are most often used.

Component D is a particulate solid which is substantially inert under the prevailing conditions and substantially insoluble in components B and C. Since it will remain in the ionomer composition as recovered, it should be chosen with an eye to desirability or harmlessness as a constituent of said composition.

When the presence of an inert filler is desired or tolerable, such inorganic materials as talc, clay or limestone may be employed. Most often, however, component D is a substantially inert polymer.

A preferred class of polymers useful as component D consists of the various types of polyphenylene ethers. Also known as polyphenylene oxides, they comprise a plurality of structural units having the formula

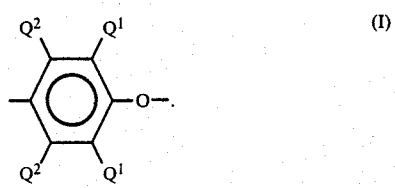

(I)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

In step I of the method of this invention, intimate contact is effected between components A, B, C and D as previously defined. The proportions of said components are adjusted to provide a weight ratio of component D to component A of at least about 0.25:1 and preferably about 1.0–3.0:1. Also, the volume ratio of component C to component B is usually at least 1:1 and preferably about 1.5–2.0:1. One advantage of the method of this invention, as contrasted with that of the aforementioned U.S. Pat. No. 4,511,712, is that volume ratios of component C to component B above about 2:1 are generally not required.

Intimate contact may be maintained by conventional techniques, as by the use of ordinary stirring equipment. The temperature of such contact is generally in the range of about 15°–40° C. and preferably at room temperature (i.e., about 25° C.).

When component B is methylene chloride and component D is a polyphenylene ether, the conditions should be chosen so as to minimize precipitation of a polyphenylene ether-methylene chloride complex as described by Factor et al. in *J. Polymer Sci., Polymer Letters Ed.*, 7, 205–209 (1969). This may be achieved by introducing at least a portion of component C prior to addition of the polyphenylene ether.

In general, little or none of the ionomer precipitates during step I. Precipitation is achieved upon addition of component E (step II). This component may be added as a solid but is generally most conveniently added in the form of a solution in component C; said solution is sometimes referred to hereinafter as the "salt solution".

Most often, the counterion in component E is identical to that in the ionomer or below it in the ion affinity sequence. Salts containing such ions are incapable of undergoing a metathesis reaction with the ionomer. Illustrative ions which are suitably low in said sequence are the lithium, sodium and potassium cations and the bicarbonate, acetate and fluoride anions. It is, however, within the scope of the invention to employ a salt having a higher counterion, whereupon metathesis is possible and the ionomer isolated will have a different counterion from that originally employed. The identity of the other ion in the salt is not critical; alkali metal, alkaline earth metal, ammonium and amine-derived cations and such anions as chloride, sulfate, nitrate, acetate and phosphate are suitable.

When the ionomer is anionic, the salt is generally an ammonium, amine, lithium, sodium or potassium salt. If it is an amine salt, the amine corresponds to the amine cation of the polymer. The ammonium or corresponding amine salts are preferred. For reasons of availability and relatively low cost, ammonium chloride and the amine hydrochlorides are especially preferred, with the former generally being most preferred.

The concentration of the salt solution, although not critical, is usually fairly low owing to the limited solubility of most salts in the organic liquids employed. For example, the solubility of ammonium chloride in ethanol at ambient temperatures is only about 0.6 gram per 100 ml. It is generally convenient to employ a salt solution having a salt concentration up to about 3 grams and most often no more than about 1 gram per 100 ml. Most often, said solution contains about 25–100% of the solubility limit of the salt at room temperature.

The salt solution and other components may be blended by any method and in any order which is appropriate. It is frequently convenient to add the polymer solution to the salt solution with stirring or similar agitation. Blending is normally effected under the aforementioned temperature conditions.

Upon adding and intimately blending component E into the mixture, a particulate composition comprising components A and D precipitates. The particles thereof, which may initially be relatively soft and of low bulk density, may be hardened by addition of a further portion of component C.

Step III is the recovery of the particulate composition comprising components A and D. Recovery may often be achieved by simple filtration. However, it is usually preferred, especially when the volatility of component B is greater than that of component C, to remove component B by distillation. In addition to facilitating complete recovery, such distillation generally effects further hardening of the particles of the ionomer composition. Following distillation, it is a simple matter to separate the composition from component C by filtration, centrifugation or the like.

When other parameters, such as the identities and proportions of other components and equipment employed, are maintained constant, the average particle size of the particulate compositions obtained by the method of this invention generally varies in proportion to the amount of component E added. For the most part, said amounts are relatively small, typically about 0.2–1.5% by weight of the ionomer. As the proportion of component E increases within this range, particles with an average diameter from less than 1 mm. up to about 7.5 mm. may be produced. Another aspect of this invention, therefore, is resinous compositions comprising particles of at least one polyphenylene ether coated with a layer of at least one ionomer in the salt form, the average size of said coated particles being up to about 7.5 mm.

The ionomer compositions prepared by the method of this invention are useful in the same ways as ionomers in the salt form recovered by other methods, in application areas in which the presence of fillers or other resins is required or optional. In particular, the compositions of this invention (in which component D is a polyphenylene ether) may be used alone or in combination with other materials in conventional applications. If necessary, said compositions may be combined with impact modifiers, further ionomeric polymers and/or further polyphenylene ether, as well as other ingredients. Blending with these other ingredients may be achieved by art-recognized methods, frequently melt blending which may involve extrusion.

The invention is illustrated by a series of examples in which the ionomers employed were prepared by sulfonation of 208.3 grams of a commercially available styrene homopolymer with a mixture of 10 grams of concentrated sulfuric acid and 16.2 grams of acetic anhydride in solution in 1 liter of methylene chloride. The sulfonating agent was quenched by dropwise addition of 100 ml. of methanol and the ionomer was neutralized by dropwise addition of concentrated ammonium hydroxide solution. The ionomer solution was heated under reflux and there was added 560 ml. of methanol followed by 416 grams of a commercially available poly(2,6-dimethyl-1,4-phenylene ether) having an intrinsic viscosity in chloroform at 25° C. of about 0.49 dl./g and a number average molecular weight (as determined by gel permeation chromatography) of about 20,000, and an additional 560 ml. of methanol.

Various quantities of a solution of 100 grams of ammonium chloride in 4 liters of methanol were added dropwise, with stirring, over about 20 minutes to the ionomer solutions, whereupon the sulfonated polystyrene precipitated. About 600 ml. of a liquid mixture comprising principally methylene chloride was removed by distillation, an additional 800 ml. of methanol was added and a second 600-ml. portion of liquid removed by distillation. The solid ionomer composition was removed by filtration, washed with methanol and dried under vacuum at 70° C. The results of three runs conducted in this manner are listed in the following table.

| NH$_4$Cl amount | | Avg. particle |
|---|---|---|
| Soln., ml. | Grams | diameter, mm. |
| 35.2 | 0.88 | <1 |
| 53.2 | 1.33 | 3.2 |
| 75.2 | 1.88 | 6.4 |

Comparison was made with two controls. In the first, the ammonium chloride step was omitted; recovery of sulfonated polystyrene was incomplete. In the second, the polyphenylene ether was omitted and the sulfonated polystyrene solution was added slowly, with vigorous stirring, to a saturated ammonium chloride solution in methanol, in a volume ratio of methanol to methylene chloride of 3:1. Upon filtration, the sulfonated polystyrene was obtained in a form ranging from fibrous strands to large particles, depending on the degree of agitation. In larger scale runs using this method, control of particle size was possible only by employing a large high-shear mixer.

What is claimed is:

1. A method for precipitating an ionomer composition which comprises:
    (I) effecting intimate contact between a solution of (A) at least one ionomer in the salt form in (B) a non-polar organic liquid; (C) a polar liquid which is soluble in component B and in which component A has only limited solubility; and (D) a particulate solid which is substantially insoluble in components B and C, the weight ratio of said particulate solid to component A being at least about 0.25:1;
    (II) intimately contacting the resulting mixture with (E) at least one inorganic salt to cause precipitation of a particulate composition comprising a salt of said ionomer and component D; and
    (III) recovering said particulate composition in the form of particles of component (D) coated with a layer of component (A).

2. A method according to claim 1 wherein component A contains anionic substituents and is isolated in the ammonium or amine salt form, component B is a chlorinated aliphatic hydrocarbon and the counterion in component E is identical to that of component A or below it in the ion affinity sequence.

3. A method according to claim 2 wherein component A has a pK$_a$ value in the free acid form up to about 5.0.

4. A method according to claim 3 wherein the volume ratio of component C to component B is about 1.5–2.0:1 and the weight ratio of component D to component A is about 1.0–3.0:1.

5. A method according to claim 4 wherein component A is a substantially aromatic polymer and the ionic substituents thereon are ammonium sulfonate groups, and the counterion in component E is ammonium, amine corresponding to the amine cation of said ionomer, lithium, sodium or potassium.

6. A method according to claim 5 wherein component B is methylene chloride and component E is an ammonium salt.

7. A method according to claim 6 wherein component E is introduced as a solution in component C.

8. A method according to claim 7 wherein component A is a sulfonated polystyrene containing up to about 5% by weight of ionic substituents.

9. A method according to claim 8 wherein component C is methanol and component E is ammonium chloride.

10. A method according to claim 9 wherein step III includes removal of methylene chloride by distillation.

11. A method according to claim 10 wherein component D is an inorganic filler.

12. A method according to claim 10 wherein component D is a polyphenylene ether.

13. A method according to claim 12 wherein at least a portion of the methanol is introduced prior to the polyphenylene ether.

14. A method according to claim 13 wherein component D is a poly-(2,6-dimethyl-1,4-phenylene ether).

15. A resinous composition comprising particles of at least one polyphenylene ether coated with a layer of at least one ionomer in the salt form, the average size of said coated particles being up to about 7.5 mm.

16. A composition according to claim 15 wherein the ionomer contains anionic substituents and is in the ammonium or amine salt form.

17. A composition according to claim 16 wherein the ionomer has a pK$_a$ value in the free acid form up to about 5.0.

18. A composition according to claim 17 wherein the ionomer is a substantially aromatic polymer and the ionic substituents thereon are ammonium sulfonate groups.

19. A composition according to claim 19 wherein the ionomer is a sulfonated polystyrene containing up to about 5% by weight of ionic substituents.

20. A composition according to claim 19 wherein the polyphenylene ether is a poly-(2,6-dimethyl-1,4-phenylene ether).

* * * * *